(12) United States Patent
Nakamura et al.

(10) Patent No.: US 12,444,760 B2
(45) Date of Patent: Oct. 14, 2025

(54) SERVICE PROVIDING MOBILE UNIT

(71) Applicant: TOYOTA JIDOSHA KABUSHIKI KAISHA, Toyota (JP)

(72) Inventors: Masashi Nakamura, Toyota (JP); Zixun Mei, Tokyo-to (JP); Nobuyuki Tomatsu, Nagoya (JP); Masashi Nakamura, Nagoya (JP); Junichi Oura, Okazaki (JP); Yusuke Nishida, Susono (JP); Yuki Bisaiji, Tokyo-to (JP); Masahiro Iwamoto, Nisshin (JP); Takao Kataoka, Nagoya (JP); Tatsuyuki Hayashi, Toyota (JP); Saki Morimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 552 days.

(21) Appl. No.: 17/961,239

(22) Filed: Oct. 6, 2022

(65) Prior Publication Data
US 2023/0116835 A1  Apr. 13, 2023

(30) Foreign Application Priority Data

Oct. 8, 2021 (JP) ................................. 2021-166347

(51) Int. Cl.
*H01M 8/04082* (2016.01)
*B60P 3/00* (2006.01)
(Continued)

(52) U.S. Cl.
CPC ........... *H01M 8/04201* (2013.01); *F17C 7/00* (2013.01); *H01M 8/04089* (2013.01);
(Continued)

(58) Field of Classification Search
CPC ......... H01M 8/04201; H01M 8/04447; H01M 8/04753; H01M 8/04089; F17C 7/00; F17C 2270/0184; F17C 2270/0168; F17C 2221/012; F17C 2205/0107; F17C 2265/061; F17C 2205/0323; F17C 2201/0109; F17C 2201/058; F17C 2250/043
See application file for complete search history.

(56) References Cited

U.S. PATENT DOCUMENTS

2006/0232043 A1   10/2006  Inoue et al.
2014/0342260 A1   11/2014  Koyama et al.

FOREIGN PATENT DOCUMENTS

JP    2002-17921 A    1/2002
JP    2006-298087 A   11/2006
(Continued)

*Primary Examiner* — Sarah A. Slifka
(74) *Attorney, Agent, or Firm* — Sughrue Mion, PLLC (57) ABSTRACT

A service providing mobile unit 1 comprised of a frame 2 forming a ring shape about a horizontal axis, movement-use wheels 4, 5 attached to the bottom part of the frame 2, a hydrogen storage tank insert pan 10 formed inside the frame 2, and a fuel cell 40 arranged inside the frame 2. Hydrogen is supplied to the fuel cell 40 from a replaceable hydrogen storage tank 20 inserted into the hydrogen storage tank insert part 10. A service providing space 3 having a ring-shaped inner circumference surface of the frame 2 as its outer edges is formed by the frame 2, and power can be supplied from the fuel cell 40 to a service providing unit installed inside the service providing space 3.

21 Claims, 9 Drawing Sheets

(51) Int. Cl.
*B62D 63/02* (2006.01)
*F17C 7/00* (2006.01)
*H01M 8/04089* (2016.01)
*H01M 8/0444* (2016.01)
*H01M 8/04746* (2016.01)

(52) U.S. Cl.
CPC ... *H01M 8/04447* (2013.01); *H01M 8/04753* (2013.01); *B60P 3/00* (2013.01); *B62D 63/02* (2013.01); *F17C 2201/0109* (2013.01); *F17C 2201/058* (2013.01); *F17C 2205/0107* (2013.01); *F17C 2205/0323* (2013.01); *F17C 2221/012* (2013.01); *F17C 2250/043* (2013.01); *F17C 2250/0439* (2013.01); *F17C 2265/061* (2013.01); *F17C 2270/0168* (2013.01); *F17C 2270/0184* (2013.01); *H01M 2250/20* (2013.01)

(56) References Cited

FOREIGN PATENT DOCUMENTS

| | | |
|---|---|---|
| JP | 2007-45301 A | 2/2007 |
| JP | 2013-119272 A | 6/2013 |
| JP | 2017-118786 A | 6/2017 |
| JP | 2019-107045 A | 7/2019 |
| JP | 2021-115958 A | 8/2021 |

SERVICE PROVIDING MOBILE UNIT

FIELD

The present invention relates to a service providing mobile unit.

BACKGROUND

In a vehicle which is driven by a fuel cell, known is a vehicle which pulls a pulled vehicle mounting a hydrogen storage tank and which can supply hydrogen to the fuel cell from the hydrogen storage tank carried by the pulled vehicle (for example, see Japanese Unexamined Patent Publication No. 2021-115958).

SUMMARY

However, this vehicle uses the power generated by the fuel cell only for running the vehicle. Using the power generated by the fuel cell for other applications is not suggested at all.

Therefore, according to the present invention, there is provided a service providing mobile unit comprising:
a frame forming a ring shape about a horizontal axis,
movement-use wheels attached to a bottom part of the frame,
a hydrogen storage tank insert part formed inside the frame, and
a fuel cell arranged inside the frame, wherein
hydrogen is supplied to the fuel cell from a replaceable hydrogen storage tank inserted in the hydrogen storage tank insert part,
a service providing space having a ring-shaped inner circumference surface of the frame as its outer edges is formed by the frame, and
power can be supplied from the fuel cell to a service providing unit installed inside the service providing space.

In the present invention, the power generated by the fuel cell can be used for various applications.

DESCRIPTION OF EMBODIMENTS

Figure 1A:
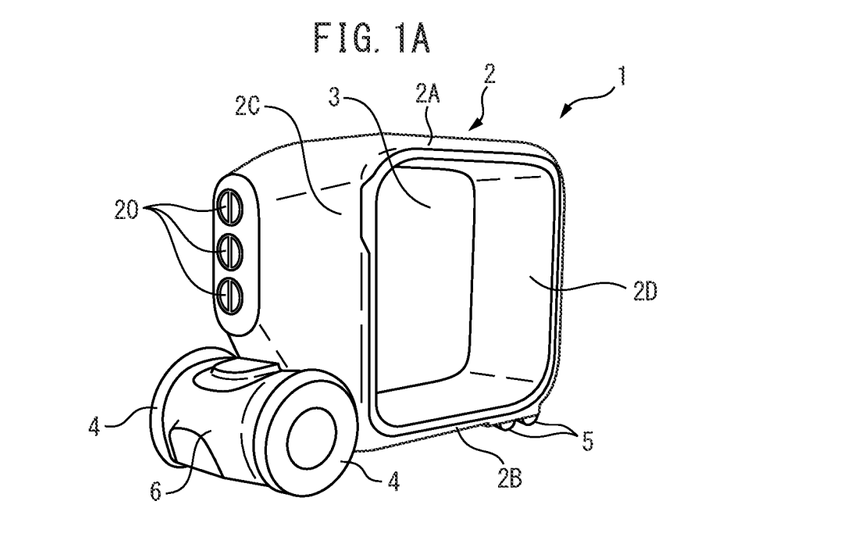
FIG. 1A, FIG. 1B, and FIG. 1C are respectively a perspective view, side view, and plan view of a service providing mobile unit according to the present invention.
Figure 1B:
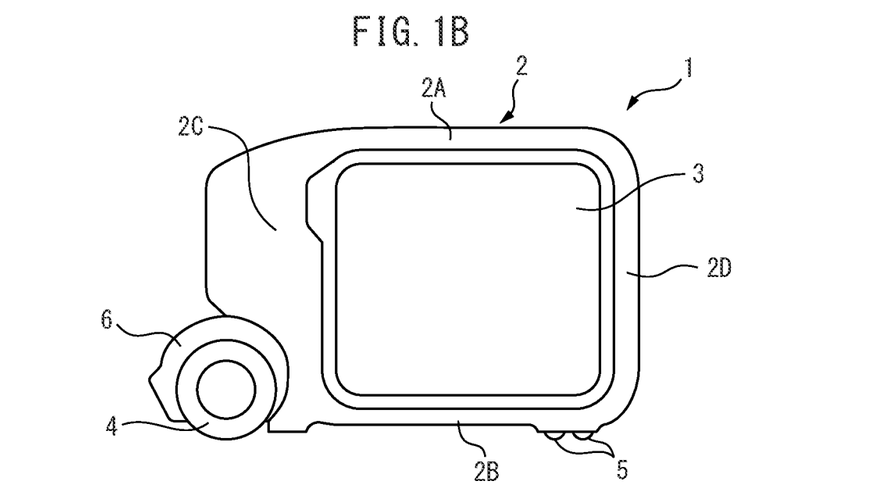
Figure 1C:
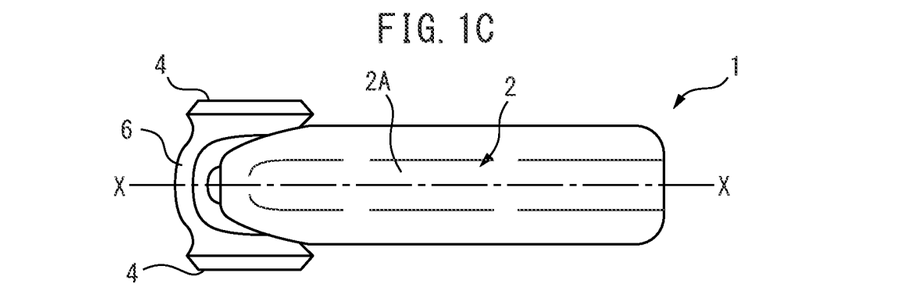
Figure 2:
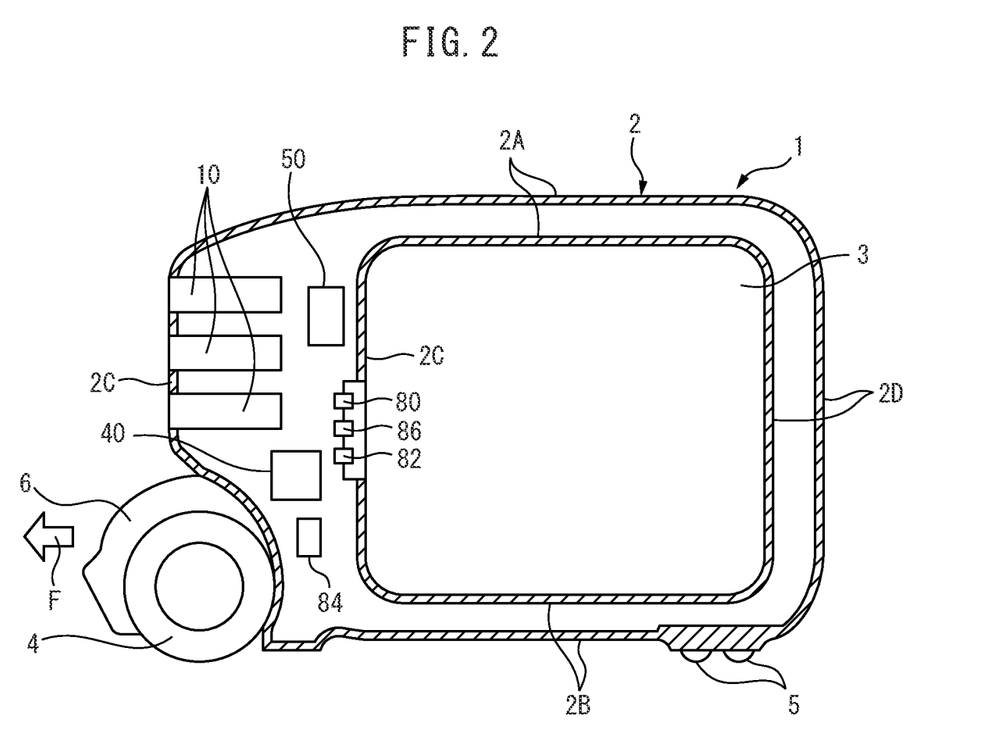
FIG. 2 is a side cross-sectional view of a service providing mobile unit according to the present invention.

FIG. 1A, FIG. 1B, and FIG. 1C are respectively a perspective view, side view, and plan view of a service providing mobile unit according to the present invention, while FIG. 2 is an enlarged side cross-sectional view of a service providing mobile unit shown in FIG. 1B.

As will be understood from FIG. 1C, a service providing mobile unit 1 has a shape symmetrical about a vertical plane X-X, and the horizontal width of the service providing mobile unit 1 (length in direction perpendicular to vertical plane X-X) is formed smaller compared with the horizontal direction length of the service providing mobile unit 1 along the vertical plane X-X and the height of the service providing mobile unit 1.

On the other hand, the service providing mobile unit 1 according to the present invention is provided with a frame 2 forming a ring shape about a horizontal axis and movement-use wheels 4 and 5 attached to the bottom part of the frame 2. As shown in FIG. 1A, FIG. 1B, FIG. 1C, and FIG. 2, the frame 2 is comprised of an upper frame part 2A and lower frame part 2B arranged facing each other and a side frame part 2C and side frame part 2D arranged facing each other. The upper frame part 2A, lower frame part 2B, and side frame part 2D extend in strip shapes with uniform horizontal widths. As shown in FIG. 1A, FIG. 1B, FIG. 1C, and FIG. 2, due to these upper frame part 2A, lower frame part 2B, side frame part 2C, and side frame part 2D, a service providing space 3 is formed having the flat inner circumferential surface of the upper frame part 2A, the flat inner circumferential surface of the lower frame part 2B, the flat inner circumferential surface of the side frame part 2C, and the flat inner circumferential surface of the side frame part 2D as its outer edges.

In the example shown in FIG. 1A, FIG. 1B, FIG. 1C, and FIG. 2, this service providing space 3, if viewed from a side surface, is formed to have a substantially square shape, but this service providing space 3 can also be formed so as to have a circular shape, semicircular shape, or other polygonal shape other than a square shape when viewed from a side surface. However, if viewed from the viewpoint of the effective utilization and general applicability of the service providing space 3, the service providing space 3 is preferably formed so as to have a substantially square shape such as shown in FIG. 2. Therefore, below, the present invention will be explained using as an example the case where the service providing space 3 is formed into a substantially square shape such as shown in FIG. 2.

Now, as shown in FIG. 1A, FIG. 1B, FIG. 1C, and FIG. 2, a small-sized motor unit 6 having a pair of drive wheels 4 is attached to one end portion of the lower frame part 2B extending in a strip shape, while a plurality of driven wheels 5 are attached to the other end portion of the lower frame part 2B. The service providing mobile unit 1 according to the present invention is made to move forward by this small-sized motor unit 6 in the direction shown by the arrow F (FIG. 2). This small-sized motor unit 6 can move independently by automated driving and is connected to one end portion of the lower frame part 2B according to need. FIG.

1A, FIG. 1B, FIG. 1C, and FIG. 2 show when the small-sized motor unit 6 is connected to one end portion of the lower frame part 2B.

This small-sized motor unit 6 communicates with a mobile unit management server for managing the service providing mobile unit 1 through a communication network. Based on commands from the mobile unit management server, the small-sized motor unit 6 is made to move by automated driving until the required service providing mobile unit 1 and is connected to the required service providing mobile unit 1. Next, based on commands from the mobile unit management server, the service providing mobile unit 1 is made to move by the small-sized motor unit 6 to a destination. Next, based on commands from the mobile unit management server, the small-sized motor unit 6 is separated from the service providing mobile unit 1 and made to move by automated driving to the next required service providing mobile unit 1. Note that, this small-sized motor unit 6 can also be configured to be constantly connected to the service providing mobile unit 1.

As shown in FIG. 2, the inside of the frame 2 forms a hollow, and a plurality of hydrogen storage tank insert parts 10 are formed inside the frame 2. In the example shown in FIG. 1A, FIG. 1B, FIG. 1C, and FIG. 2, the outer circumferential wall and inner circumferential wall of the side frame part 2C are formed so that the distance between these outer circumferential wall and inner circumferential wall becomes broader, and at the outer circumferential wall of this side frame part 2C, a plurality of the hydrogen storage tank insert parts 10 are formed arranged aligned in the vertical direction at distances from each other. As will be understood from FIG. 1A, replaceable hydrogen storage tanks 20 are inserted into these hydrogen storage tank insert parts 10. Note that, in the example shown in FIG. 1A, FIG. 1B, FIG. 1C, and FIG. 2, three hydrogen storage tank insert parts 10 are formed inside the frame 2, but needless to say, four or more hydrogen storage tank insert parts 10 can be formed inside the frame 2.

Here, if focusing on the overall configuration of the service providing mobile unit 1, in the example shown in FIG. 1A, FIG. 1B, FIG. 1C, and FIG. 2, the frame 2 is provided with the side frame part 2C extending upward from one end portion of the lower frame part 2B. The side frame part 2C is positioned further rearward than the forward direction end portion of the small-sized motor unit 4 connected to one end portion of the lower frame part 2B, and the hydrogen storage tank insert parts 10 are formed at the side frame part 2C positioned further rearward than the forward direction end portion of the small-sized motor unit 4. Therefore, for example, even if another vehicle approaches from the forward direction of the service providing mobile unit 1 and collides with the service providing mobile unit 1, the small-sized motor unit 4 acts as a shield so the danger of the other vehicle striking the hydrogen storage tanks 20 inside the hydrogen storage tank insert parts 10 is eliminated. As a result, the safety of the hydrogen storage tanks 20 can be secured.

On the other hand, as shown in FIG. 2, a fuel cell 40 is arranged inside the frame 2. This fuel cell 40 is supplied with hydrogen from hydrogen storage tanks 20 inserted inside the hydrogen storage tank insert parts 10. The fuel cell 40 generates power by this supplied hydrogen. This generated power of the fuel cell 40 is used for various purposes. For example, this generated power of the fuel cell 40 is supplied to a service providing unit placed inside the service providing space 3. Further, this generated power of the fuel cell 40 can, for example, be used as a power source when a disaster etc. causes a blackout. In this case, the service providing mobile unit 1 acts as a mobile power generating station.

Figure 3A:
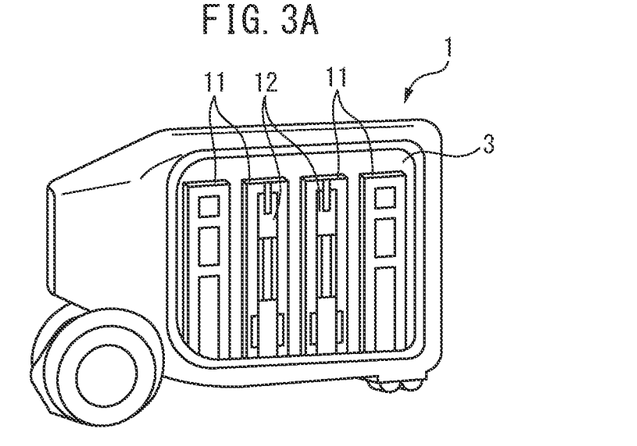
FIG. 3A, FIG. 3B, and FIG. 3C are respectively views showing various examples of utilization of a service providing mobile unit according to the present invention.

Next, referring to FIG. 3A, FIG. 3B, and FIG. 3C, a typical example of a service providing unit installed in the service providing space 3 will be explained. Referring to FIG. 3A, in this example, the service providing unit is comprised of a plurality of electric skate charging racks 11 set on the inner circumferential surface of the lower frame part 2B inside the service providing space 3. In this service providing unit, if placing electric skates 12 at a charging rack 11, the batteries of the electric skates 12 are charged by the generated power of the fuel cell 40 while the electric skates 12 are placed at the charging rack 11.

Figure 3B:
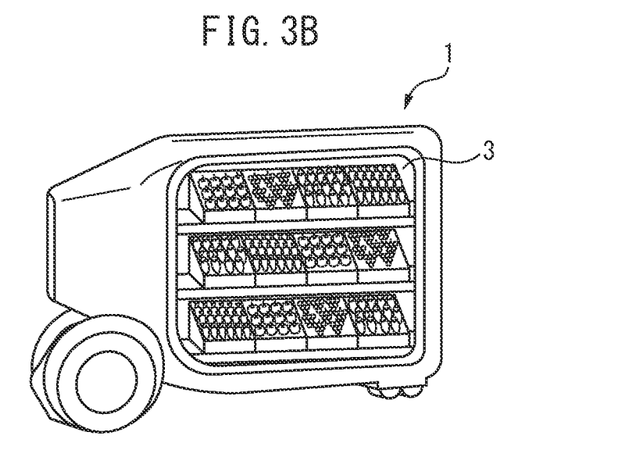
Figure 3C:
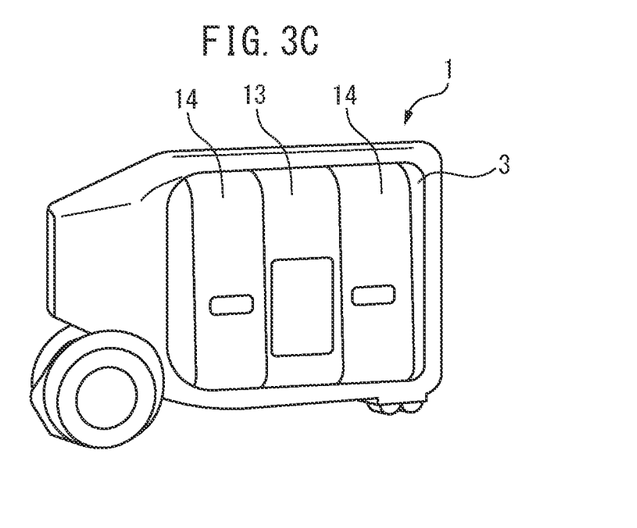

On the other hand, in the example shown in FIG. 3B, the service providing unit is comprised of product display racks installed inside the service providing space 3 for selling vegetables or other products. In this example, the generated power of the fuel cell 40 is used to operate the lighting equipment, payment settlement equipment, product cooling equipment, etc. Further, in the example shown in FIG. 3C, the service providing unit is comprised of a vending machine 13 and garbage receptacles 14 set at the inner circumferential surface of the lower frame part 2B inside the service providing space 3. In this example, the generated power of the fuel cell 40 is used to operate the vending machine 13.

Figure 4A:
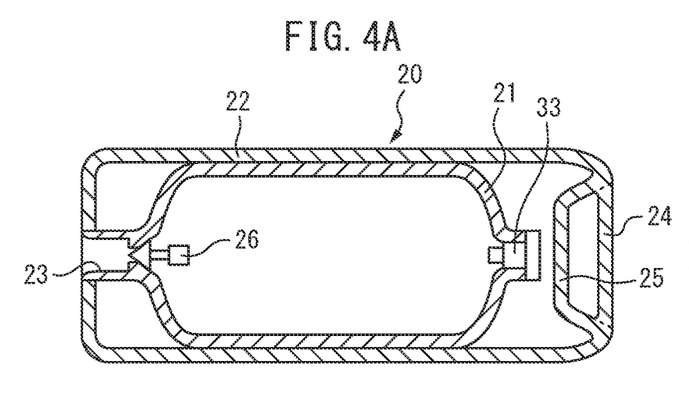
FIG. 4A is a side cross-sectional view of a schematically illustrated hydrogen storage tank.
Figure 4B:
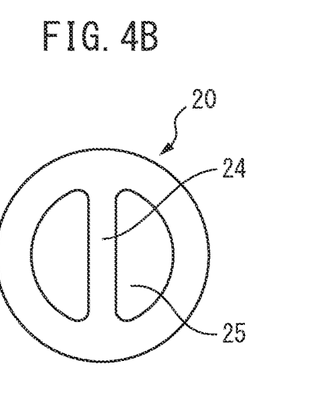
FIG. 4B is a side view of FIG. 4A.

Next, the hydrogen storage tank insert parts 10 formed inside the frame 2 and the hydrogen storage tanks 20 inserted inside the hydrogen storage tank insert parts 10 will be explained while referring to FIG. 4A to FIG. 4D. FIG. 4A is a schematically illustrated side cross-sectional view of the hydrogen storage tank 20 inserted into the hydrogen storage tank insert part 10, while FIG. 4B shows a side view of the hydrogen storage tank 20 shown in FIG. 4A when viewing the hydrogen storage tank 20 from the right direction. Referring to FIG. 4A, the hydrogen storage tank 20 is comprised of a tank body 21 and a cylindrical casing 21 surrounding the tank body 21. In the example shown in FIG. 4A, the inside of the tank body 21 is filled with high pressure hydrogen gas. Note that, a hydrogen storing alloy may also be placed inside the tank body 21.

At one end portion of the tank body 21, that is, one end portion of the hydrogen storage tank 20, a hydrogen outflow part 23 is formed. At the other end portion of the hydrogen storage tank 20, a handle 24 able to be gripped by the hand, that is, a grippable handle 24 is formed. In the example shown in FIG. 4A and FIG. 4B, the two end faces of the cylindrical casing 22, that is, the two end faces of the hydrogen storage tank 20, are formed from flat surfaces. The hydrogen outflow part 23 is formed as a recessed cylindrical groove sunken in from one flat end face of the hydrogen storage tank 20. On the other hand, a recessed groove 25 forming a circular contour shape is formed on the other flat surface of the hydrogen storage tank 20. Inside this recessed groove 25, a handle 24 is formed extending between facing top edge portions of the recessed groove 25 separated by a distance from the bottom portion of the recessed groove 25 so as to be able to be gripped.

Figure 4C:
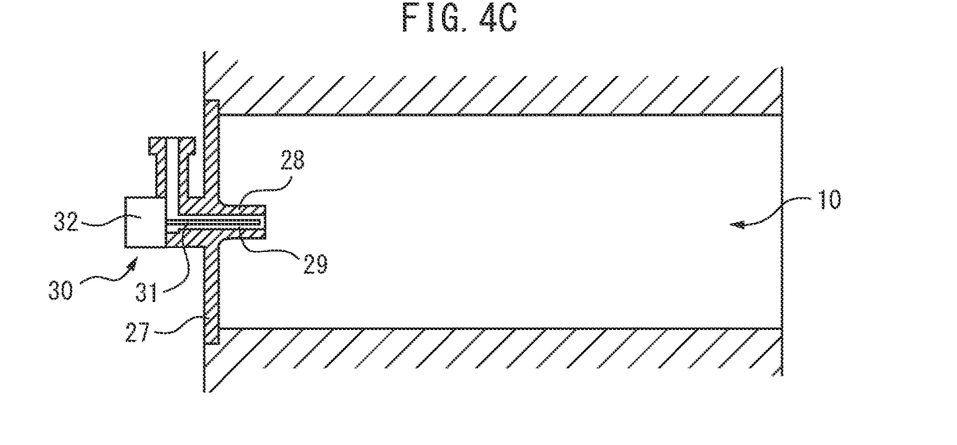
FIG. 4C is a side cross-sectional view of a schematically illustrated hydrogen storage tank insert part.

Further, in FIG. 4A, a normally closed type outflow control valve 26 which is placed inside the tank body 21 for controlling the outflow of hydrogen from the hydrogen outflow part 23 is schematically shown. The outflow control valve 26 usually closes the hydrogen outflow part 23 by a pressure of compressed hydrogen inside of the tank body 21. On the other hand, FIG. 4C shows an enlarged side cross-sectional view of the hydrogen storage tank insert part 10. Referring to FIG. 4C, the deep portion of the hydrogen storage tank insert part 10 is formed with a projecting hydrogen inflow part 28 sticking out to the inside of the hydrogen storage tank insert part 10 from an end wall 27 covering one end part of the hydrogen storage tank insert part 10. Inside of this projecting hydrogen inflow part 28, a hydrogen inflow passage 29 connected to the fuel cell 40 is formed.

Figure 4D:
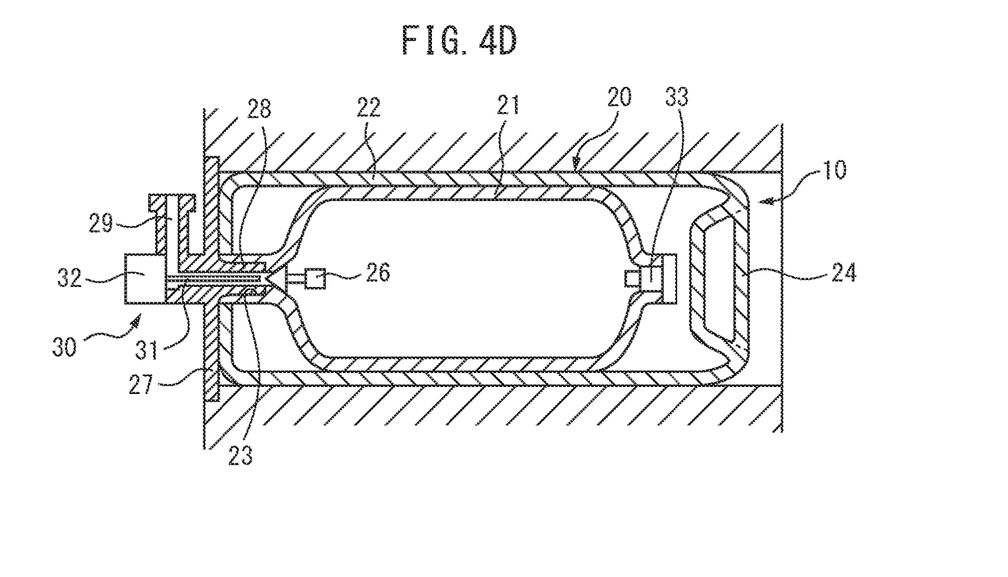
FIG. 4D is a view showing when a hydrogen storage tank is inserted into a hydrogen storage tank insert part.

On the other hand, FIG. 4D shows when the hydrogen storage tank 20 is inserted into the hydrogen storage tank insert part 10. The work of inserting the hydrogen storage tank 20 into the hydrogen storage tank insert part 10 is performed by gripping the handle 24 by the hand, inserting the end portion of the hydrogen storage tank 20 at which the hydrogen outflow part 23 is formed into the hydrogen storage tank insert part 10, and pushing the hydrogen storage tank 20 inside the hydrogen storage tank insert part 10. If the hydrogen storage tank 20 is pushed inside of the hydrogen storage tank insert part 10, the recessed hydrogen outflow part 23 is fitted onto the projecting hydrogen inflow part 28. Explaining this from a structural viewpoint, around the hydrogen storage tank insert part 10, a guide wall is formed for guiding the recessed hydrogen outflow part 23 of the hydrogen storage tank 20 to the projecting hydrogen inflow part 28 when inserting the hydrogen storage tank 20 into the hydrogen storage tank insert part 10. When the hydrogen storage tank 20 is inserted into the hydrogen storage tank insert part 10, the recessed hydrogen outflow part 23 of the hydrogen storage tank 20 is guided by this guide wall to the projecting hydrogen inflow part 28 so as to be fitted onto the projecting hydrogen inflow part 28.

In this case, this guide wall acts to hold the hydrogen storage tank 20 in a state where the recessed hydrogen outflow part 23 is fitted onto the projecting hydrogen inflow part 28. In the example shown in FIG. 4C and FIG. 4D, this guide wall is formed from the cylindrical wall. In this case, this guide wall does not necessarily have to be formed from the cylindrical wall. As this guide wall, for example, in FIG. 4D, a guide rod extending along the circumference of the hydrogen storage tank 20 in the longitudinal direction of the hydrogen storage tank insert part 10 or a guide rod with a guide roller can be used.

On the other hand, the recessed hydrogen outflow part 23 and the projecting hydrogen inflow part 28 have a coupling structure whereby the recessed hydrogen outflow part 23 is coupled with the projecting hydrogen inflow part 28 when the recessed hydrogen outflow part 23 is made to rotate about the long center axis of the hydrogen storage tank 20 after the recessed hydrogen outflow part 23 is fitted onto the projecting hydrogen inflow part 28 as shown in FIG. 4D. As this coupling structure, for example, the inner circumferential surface of the recessed hydrogen outflow part 23 and the outer circumferential surface of the projecting hydrogen inflow part 28 are respectively made screw structures forming screw threads. Therefore, in the example shown in FIG. 4C and FIG. 4D, after the hydrogen storage tank 20 is inserted inside of the hydrogen storage tank insert part 10 and the recessed hydrogen outflow part 23 is fitted onto the projecting hydrogen inflow part 28, by rotating the handle 24 gripped by the hand about the longitudinal center axis of the hydrogen storage tank 20, the recessed hydrogen outflow part 23 is coupled with the projecting hydrogen inflow part 28.

On the other hand, when replacing the hydrogen storage tank 20, the handle 24 is gripped by the hand and the hydrogen storage tank 20 is made to rotate so as to uncouple the recessed hydrogen outflow part 23 and the projecting hydrogen inflow part 28, then the hydrogen storage tank 20 is pulled out from the hydrogen storage tank insert part 10. Then, a new hydrogen storage tank 20 is inserted into the hydrogen storage tank insert part 10. The pulled out hydrogen storage tank 20 is filled by a hydrogen filling apparatus with new hydrogen from the hydrogen outflow part 23.

In this way, the work of inserting the hydrogen storage tank 20 inside of the hydrogen storage tank insert part 10 and the work of coupling the recessed hydrogen outflow part 23 and the projecting hydrogen inflow part 28 can be performed by gripping the handle 24, so the work of setting the hydrogen storage tank 20 to the hydrogen storage tank insert part 10 and the work of detaching the hydrogen storage tank 20, that is, the work of replacing the hydrogen storage tank 20 can be easily performed. Further, by gripping the handle 24 by the hand, the hydrogen storage tank 20 can be easily transported. Further, since the two end faces of the hydrogen storage tank 20 are formed from flat surfaces, the hydrogen storage tank 20 can be placed standing on the floor and, further, hydrogen storage tanks 20 can be easily stacked in a standing state. Therefore, the hydrogen storage tanks 20 are easily stored.

In this way, in the embodiment of the present invention, the hydrogen inflow parts 28 connected to the fuel cell 40 are formed at the deep portions of the hydrogen storage tank insert parts 10. The hydrogen outflow parts 23 which are coupled with the hydrogen inflow parts 28 when the hydrogen storage tanks 20 are inserted into the hydrogen storage tank insert parts 10 are formed at one end portions of the hydrogen storage tanks 20 while handles 24 able to be gripped are formed at other end portions of the hydrogen storage tanks 20. The work of inserting the hydrogen storage tanks 20 inside of the hydrogen storage tank insert parts 10 and the work of coupling the hydrogen inflow parts 28 and the hydrogen outflow parts 23 are performed by gripping the handles 24. In this case, in the embodiment of the present invention, the work of coupling the hydrogen inflow parts 28 and the hydrogen outflow parts 23 is performed by gripping the handles 24 and rotating the hydrogen storage tanks 20.

On the other hand, valve opening control devices 30 for controlling the opening of the normally closed type outflow control valves 26 are arranged at the projecting hydrogen inflow parts 28. FIG. 4C and FIG. 4D schematically show such a valve opening control device 30. In the example of FIG. 4C and FIG. 4D, this valve opening control device 30 is comprised of a control rod 31 able to engage with the outflow control valve 26 and an actuator 32 comprised of, for example, a solenoid, for driving the control rod 31. If the solenoid is energized, the control rod 31 abuts against the outflow control valve 26 to push up the outflow control valve 26. As a result, the outflow control valve 26 opens and high pressure stored hydrogen inside the tank body 21 flows to the inside of the hydrogen inflow passage 29 of the hydrogen inflow part 28. If the solenoid is deenergized, the outflow control valve 26 closes and the outflow of stored hydrogen from the tank body 21 stops.

Further, as shown in FIG. 4A and FIG. 4D, a sensor 33 for detecting the state of stored hydrogen inside the hydrogen storage tank 20 is arranged at the end portion of the tank body 21 at the opposite side to the hydrogen outflow part 23, that is, the end portion side of the hydrogen storage tank 20 at the opposite side from the hydrogen outflow part 23. This sensor 33 is comprised of a sensor for detecting at least one of the pressure and temperature. In the example shown in FIG. 4A and FIG. 4D, the sensor 33 has a built-in transmission device for transmitting the detection signal to the outside. In this case, the detection signal of the sensor 33 can also be transmitted to the outside through a signal wire.

Figure 5:
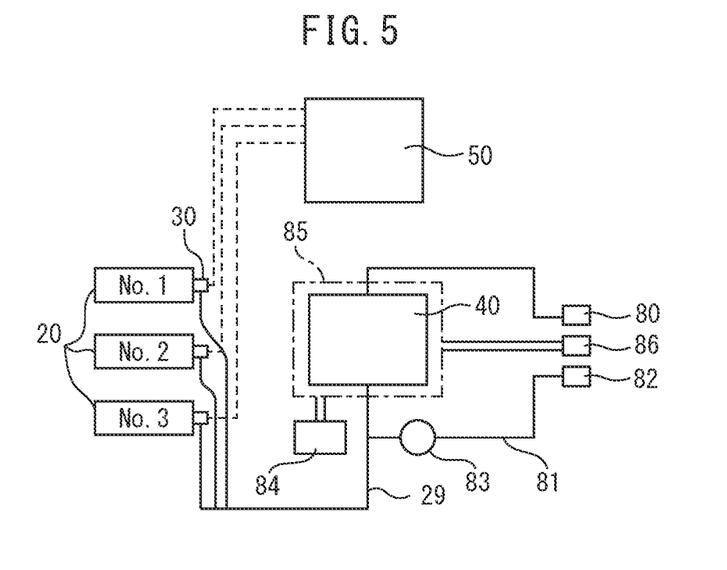
FIG. 5 is a view showing a hydrogen supply control device.

FIG. 5 shows an overall view of a hydrogen supply control device. In FIG. 5, the hydrogen storage tanks 20 inserted into hydrogen storage tank insert parts 10 are shown. Note that, in the example shown in FIG. 5, for convenience in explanation, the hydrogen storage tanks 20 inserted into the hydrogen storage tank insert parts 10 are assigned the references No. 1, No. 2, and No. 3.

Figure 6:
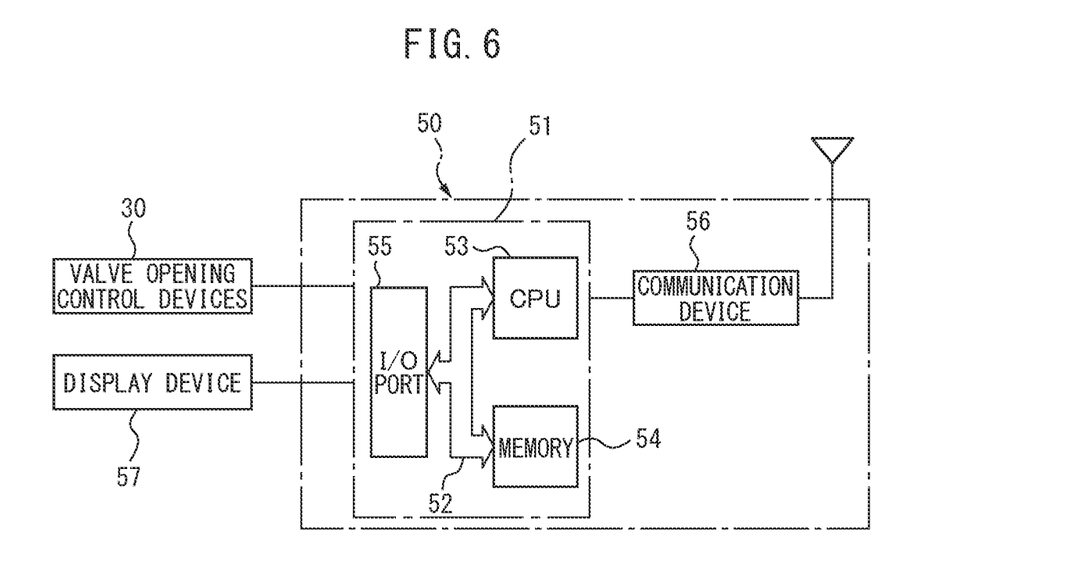
FIG. 6 is a view showing an electronic control device.

As shown in FIG. 5, all of the hydrogen storage tanks 20 are connected to the fuel cell 40 through the hydrogen inflow passage 29 shown by the solid line. The valve opening control devices 30 provided at the hydrogen storage tank insert parts 10, as shown by the broken lines, are connected to an electronic control device 50. On the other hand, FIG. 6 shows the electronic control device 50 of FIG. 5. This electronic control device 50, as shown in FIG. 2, is arranged inside the frame 2. As shown in FIG. 6, this electronic control device 50 is provided with an electronic control unit 51. This electronic control unit 51 is comprised of a digital computer provided with a CPU (microprocessor) 53, a memory 54 comprised of a ROM and RAM, and an input/output port 55, which are connected with each other by a bidirectional bus 52.

Further, the electronic control device 50 is provided with a communication device 56. This communication device 56 is connected to the electronic control unit 51. The detection signals emitted from the sensors 33 of the hydrogen storage tanks 20 are input through the communication device 56 to the electronic control unit 51. Further, as shown in FIG. 6, the valve opening control devices 30 are connected to the electronic control unit 51. Opening of the outflow control valves 26 is controlled by the valve opening control devices 30 based on the output signals of the electronic control unit 51. Further, a display device 57 having a display screen is connected to the electronic control unit 51. The display on the display screen of the display device 57 is controlled based on the output signals of the electronic control unit 51.

In the embodiment of the present invention, hydrogen is supplied to the fuel cell 40 from any one of the hydrogen storage tanks 20. If the remaining amount of hydrogen in the hydrogen storage tank 20 becomes small, hydrogen starts to be supplied to the fuel cell 40 from a new hydrogen storage tank 20, and hydrogen stops being supplied to the fuel cell 40 from the hydrogen storage tank 20 which had been used up to then. Therefore, it becomes possible to continue the supply of hydrogen to the fuel cell 40 without stopping. Therefore, the fuel cell 40 can continuously produce output. Therefore, for example, when a disaster etc. causes a blackout to occur, if using the service providing mobile unit 1 as a mobile power generating station, it is possible to continue generating power by just continuing to replace the hydrogen storage tank 20. Therefore, there can be said to be great meaning in constantly stationing the service providing mobile unit 1 and a large number of the hydrogen storage tanks 20 at each region.

Figure 7:
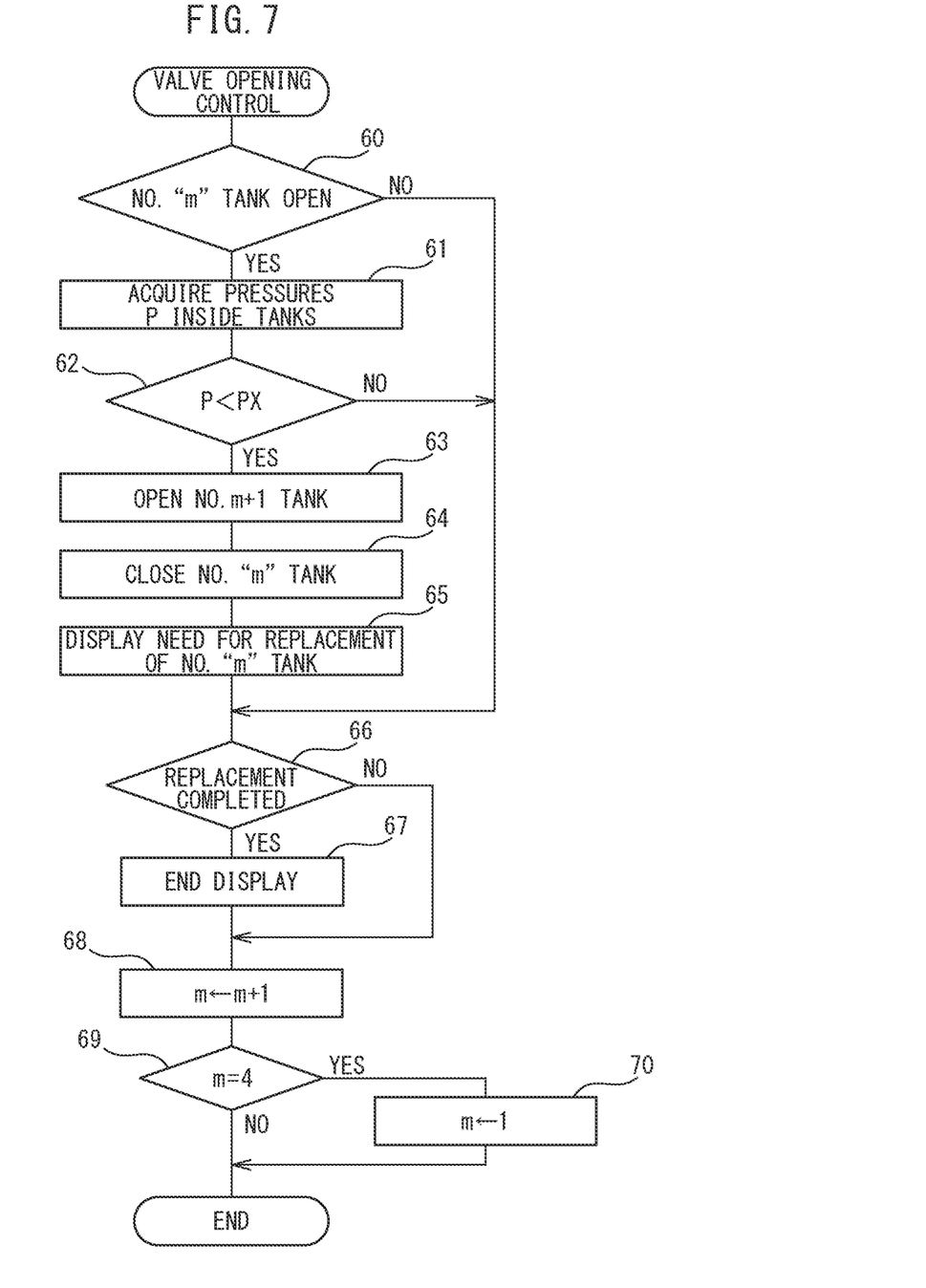
FIG. 7 is a flow chart for valve opening control.
Figure 8:
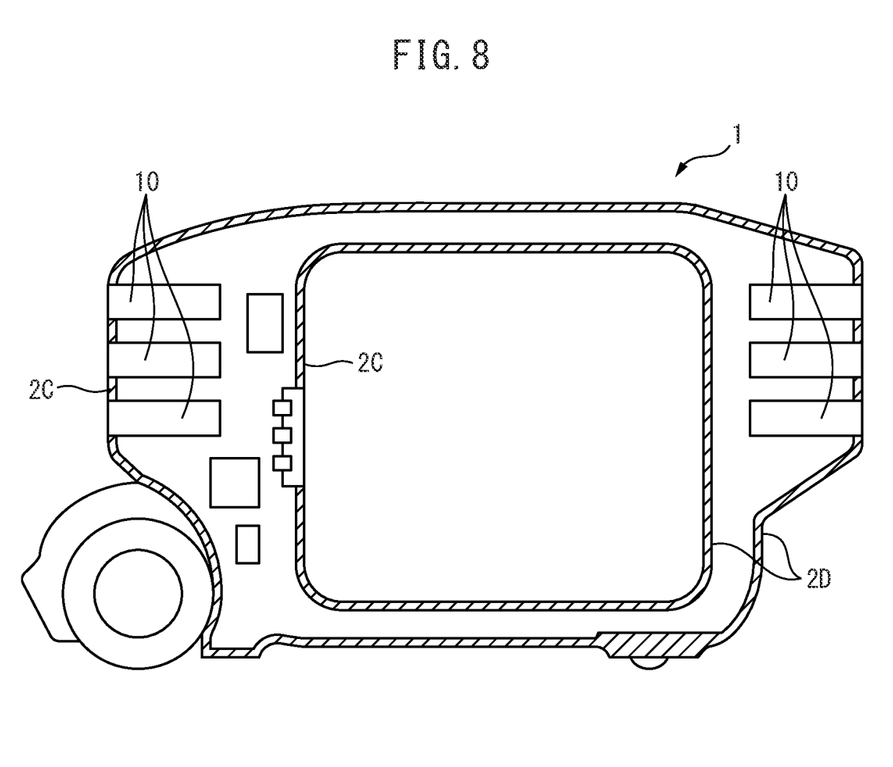
FIG. 8 is a side cross-sectional view of another embodiment of a service providing mobile unit according to the present invention.

FIG. 7 shows a valve opening control routine for controlling opening of the normally closed type outflow control valve 26. This routine is repeatedly performed in the electronic control unit 51. Referring to FIG. 7, first, at step 60, it is judged if the outflow control valve 26 of the No. "m" hydrogen storage tank 20 is open. Now, if assuming that m=1, it is judged if the outflow control valve 26 of the No. 1 hydrogen storage tank 20 is open. When it is judged that outflow control valve 26 of the No. "m" hydrogen storage tank 20 is not open, the routine jumps to step 66. As opposed to this, when at step 60 it is judged that the outflow control valve 26 of the No. "m" hydrogen storage tank 20 is open, the routine proceeds to step 61.

At step 61, the pressure P of the stored hydrogen in the No. "m" hydrogen storage tank 20 detected by the sensor 33 of the No. "m" hydrogen storage tank 20 is acquired. In the example shown in FIG. 7, this pressure P is used as the value for estimating the remaining amount of hydrogen in the hydrogen storage tank 20. Next, at step 62, it is judged whether the pressure P of the stored hydrogen inside the No. "m" hydrogen storage tank 20 falls below a set pressure PX showing an allowable limit value of the remaining amount of hydrogen, that is, whether the estimated remaining amount of hydrogen of the hydrogen storage tank 20 falls below a set amount of hydrogen. When it is judged that the pressure P of the stored hydrogen inside the No. "m" hydrogen storage tank 20 does not fall below the set pressure PX, the routine jumps to step 66. As opposed to this, when at step 62 it is judged that the pressure P of the stored hydrogen inside the No. "m" hydrogen storage tank 20 falls below the set pressure PX, the routine proceeds to step 63.

At step 63, the outflow control valves 26 of the No. m+1 hydrogen storage tank 20 is made to open. Next, at step 64, the outflow control valve 26 of the No. "m" hydrogen storage tank 20 is made to close. Next, at step 65, a display to the effect that the No. "m" hydrogen storage tank 20 should be replaced, for example, a display of "Need for replacement of No. 'm' hydrogen storage tank" is shown on the display screen of the display device 57. Further, in this case, the fact that the No. "m" hydrogen storage tank 20 should be replaced is transmitted through the communication network to the mobile unit management server. Next, the routine proceeds to step 66. At step 66, it is judged if the No. "m" hydrogen storage tank 20 has been replaced. When it is judged that the No. "m" hydrogen storage tank 20 has not been replaced, the routine jumps to step 68. As opposed to this, when at step 66 it is judged that the No. "m" hydrogen storage tank 20 has been replaced, the routine proceeds to step 67 where the display to the effect that the No. "m" hydrogen storage tank 20 should be replaced is ended. Next, the routine proceeds to step 68.

Note that, when each No. "m" hydrogen storage tank 20 has been replaced, for example, to be able to recognize that the detection signal of the sensor 33 of the new hydrogen storage tank 20 is the detection signal of the sensor 33 of the No. "m" hydrogen storage tank 20, for example, information showing the no. of the hydrogen storage tank 20 is sent from the sensor 33 of the hydrogen storage tank 20 together with the detection signal. At step 66, it is judged based on this information if the No. "m" hydrogen storage tank 20 has been replaced.

At step 68, "m" is incremented by exactly 1, then, at step 69, it is judged if "m" has become 4. When it is judged that "m" is not 4, the processing cycle is ended. As opposed to this, when it is judged that m=4 the routine proceeds to step 70 where "m" is made 1, then the processing cycle is ended. Therefore, control to open the normally closed type outflow control valve 26 of the No. 1 hydrogen storage tank to the No. 3 hydrogen storage tank is repeatedly performed.

Note that, this embodiment is configured to select a single hydrogen storage tank 20 from the hydrogen storage tanks 20 inserted inside the hydrogen storage tank insert parts 10 and supply hydrogen to the fuel cell 40 from the selected hydrogen storage tank 20, but it may also be configured to select a plurality of hydrogen storage tanks 20 from the hydrogen storage tanks 20 inserted inside the hydrogen storage tank insert parts 10 and supply hydrogen to the fuel cell 40 from the selected hydrogen storage tanks 20. It may also be configured to supply hydrogen to the fuel cell 40 from the all of the hydrogen storage tanks 20 inserted into the hydrogen storage tank insert parts 10.

In this way, in the embodiment of the present invention, a hydrogen supply control device for controlling the supply of hydrogen from the hydrogen storage tanks 20 to the fuel cell 40 is provided. This hydrogen supply control device has a remaining hydrogen amount estimating unit for estimating the remaining amount of hydrogen in the hydrogen storage tanks 20. A hydrogen storage tank 20 for supplying hydrogen to the fuel cell 40 is selected based on the estimated remaining amount of hydrogen inside the hydrogen storage tanks 20. In this case, the electronic control unit 51 forms this remaining hydrogen amount estimating unit.

Further, in this case, in the embodiment of the present invention, a plurality of hydrogen storage tank insert parts 10 are formed inside the frame 2, at least one hydrogen storage tank 20 is selected from among the hydrogen storage tanks 20 inserted in the hydrogen storage tank insert parts 10, hydrogen is supplied from the selected hydrogen storage tank 20 to the fuel cell 40, and, when the estimated remaining amount of hydrogen of the selected hydrogen storage tank 20 falls below a set amount of hydrogen, at least one next hydrogen storage tank 20 is selected from among the hydrogen storage tanks 20 inserted in the hydrogen storage tank insert parts 10 and hydrogen is supplied from the next selected hydrogen storage tank 20 to the fuel cell 40.

Further, in the embodiment of the present invention, the hydrogen supply control device has the display device 57 for displaying the fact that the hydrogen storage tank 20 should be replaced when an estimated remaining amount of hydrogen of the hydrogen storage tank 20 falls below the set amount of hydrogen. Further, in the embodiment of the present invention, the sensor 33 is placed for detecting the state of stored hydrogen in the hydrogen storage tank 20 at the end portion of the hydrogen storage tank 20 at the opposite side to the hydrogen outflow part 23. The above-mentioned remaining hydrogen amount estimating unit estimates the remaining amount of hydrogen in the hydrogen storage tank 20 based on the detection signal of the sensor 33.

Referring again to FIG. 5, the service providing mobile unit 1 is provided with a power supply terminal 80 connected to the output terminal of the fuel cell 40, that is, a supply terminal 80 of generated power of the fuel cell 40. Further, a hydrogen inflow branch passage 81 is branched from the hydrogen inflow passage 29, and the service providing mobile unit 1 is provided with a supply terminal 82 of hydrogen connected to this hydrogen inflow branch passage 81. Inside of this hydrogen inflow branch passage 81, a flow rate control valve 83 controlled by the electronic control unit 51 is arranged. On the other hand, FIG. 5 schematically shows a cooling device 85 provided with a cooling use pump 84 for cooling the fuel cell 40. The service providing mobile unit 1 is provided with a high temperature air supply terminal 86 connected to this cooling device 85. Note that, the cooling device 85 provided with this cooling use pump 84 is also arranged inside the frame 2. Further, when the fuel cell 40 is being water cooled, a high temperature water supply terminal is provided instead of a high temperature air supply terminal 86.

In this case, in the embodiment of the present invention, the supply terminal 80 of generated power of the fuel cell 40 is arranged on the frame 2 so as to be able to provide power to the outside. Note that, in the example shown in FIG. 2, the supply terminal 80 of the generated power of the fuel cell 40, hydrogen supply terminal 82, and high temperature air supply terminal 86 are arranged on the frame 2 facing the service providing space 3. Therefore, in the example shown in FIG. 2, the service providing unit arranged in the service providing space 3 can not only use the generated power of the fuel cell 40, but also can use hydrogen and high temperature air. In this case, as the service providing unit, for example, it is possible to use a cooking device using the flame of combustion of hydrogen or a heating device using high temperature air.

FIG. 8 to FIG. 10B show various examples of positions of formation of the hydrogen storage tank insert parts 10. In the example shown in FIG. 8, in addition to the hydrogen storage tank insert parts 10 formed at the side frame part 2C, the hydrogen storage tank insert parts 10 are also formed at the side frame part 2D. The hydrogen storage tank insert parts 10 formed at the side frame part 2D open in the reverse direction to the hydrogen storage tank insert parts 10 formed at the side frame part 2C. In the examples shown in FIG. 2 and FIG. 8, to enable a person in the standing state to be able to easily insert a hydrogen storage tank 20 into the hydrogen storage tank insert part 10, the hydrogen storage tank insert parts 10 are made to open in the horizontal direction and are formed at upper positions. Therefore, in these examples, there is the advantage that hydrogen storage tanks 20 are easy to insert into the hydrogen storage tank insert parts 10.

Figure 9A:
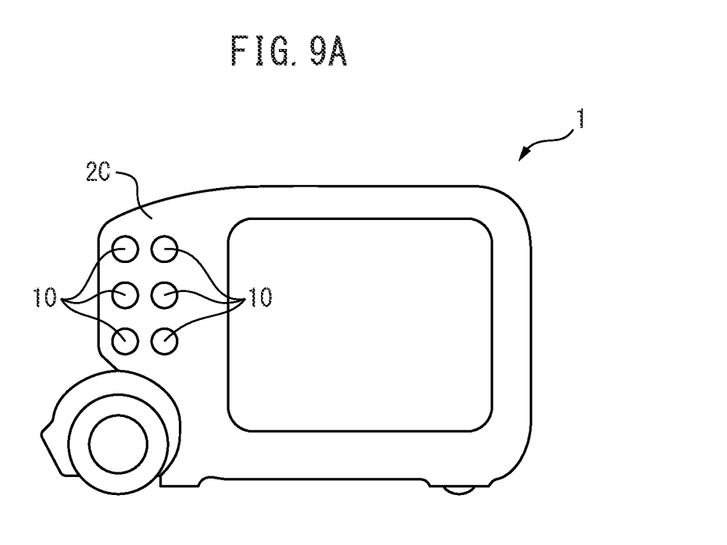
FIG. 9A and FIG. 9B are respectively a side view and plan view of still another embodiment of a service providing mobile unit according to the present invention.
Figure 9B:
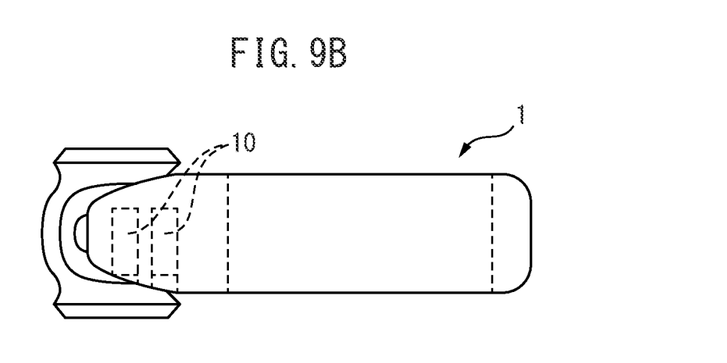
Figure 10A:
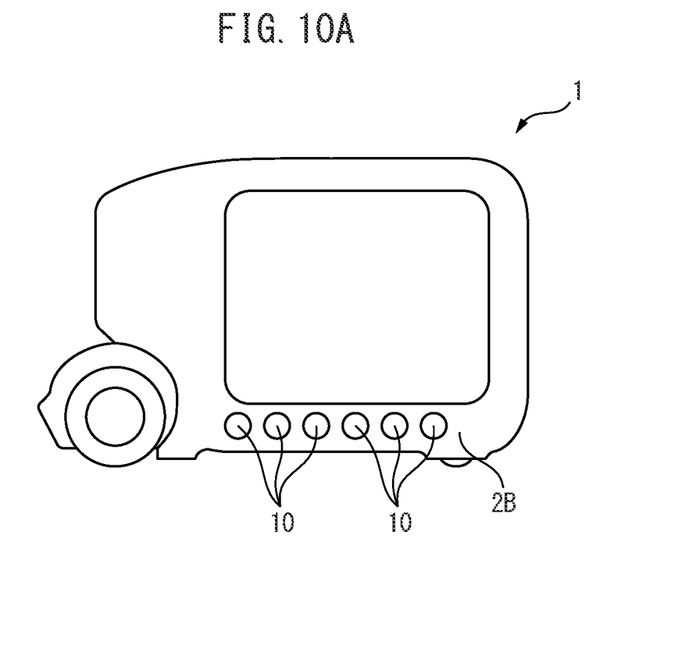
FIG. 10A and FIG. 10B are respectively a side view and plan view of a still further other embodiment of a service providing mobile unit according to the present invention.
Figure 10B:
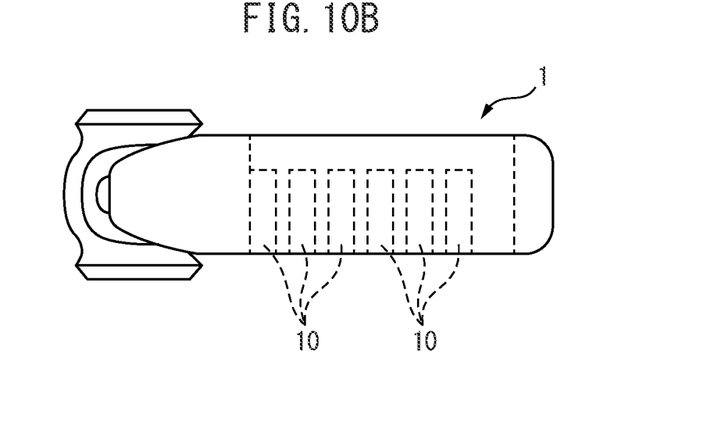

On the other hand, in the example shown in FIG. 9A and FIG. 9B, the hydrogen storage tank insert parts 10 are formed so as to extend in the transverse direction at the side frame part 2D. Therefore, in this example, the hydrogen storage tanks 20 are inserted inside the hydrogen storage tank insert parts 10 from the transverse direction. Further, in the example shown in FIG. 10A and FIG. 10B, the hydrogen storage tank insert parts 10 are formed so as to extend in the transverse direction at the lower frame part 2B. Therefore, in this example as well, the hydrogen storage tanks 20 are inserted inside the hydrogen storage tank insert parts 10 from the transverse direction.

In this way, in the embodiment of the present invention, the service providing mobile unit 1 comprises the frame 2 forming a ring shape around a horizontal axis, the movement-use wheels 4 and 5 attached to the bottom part of the frame 2, the hydrogen storage tank insert parts 10 formed inside the frame 2, and the fuel cell 40 arranged inside the frame 2. The fuel cell 40 is supplied with hydrogen from the replaceable hydrogen storage tank 20 inserted into the hydrogen storage tank insert part 10. Due to the frame 2, the service providing space 3 is formed having the ring-shaped inner circumferential surface of the frame 2 as its outer edges, and a service providing unit arranged in the service providing space 3 can be supplied with power by the fuel cell 40.

In this case, in the embodiment of the present invention, the hydrogen storage tank insert parts 10 are formed at least at one frame part of the side frame parts 2C and 2D and lower frame part 2B. Note that, in the embodiments shown in FIG. 2 and FIG. 8 to FIG. 10B, the hydrogen storage tank insert parts 10 are formed so as to extend in the horizontal direction, but it is also possible to form the hydrogen storage tank insert parts 10 inside the frame 2 so as to extend in the vertical direction so as to enable the hydrogen storage tanks 20 to be inserted into the hydrogen storage tank insert parts 10 from above and possible to form the hydrogen storage tank insert parts 10 inside the frame 2 so as to extend slanted upward, slanted downward, slanted forward, or slanted backward so as to enable the hydrogen storage tanks 20 to be inserted into the hydrogen storage tank insert parts 10 from directions slanted upward, slanted downward, slanted forward, or slanted backward.

What is claimed is:

1. A service providing mobile unit comprising:
a frame forming a ring shape about a horizontal axis,
movement-use wheels attached to a bottom part of the frame,
a hydrogen storage tank insert part formed inside the frame, and
a fuel cell arranged inside the frame, wherein
hydrogen is supplied to the fuel cell from a replaceable hydrogen storage tank inserted in the hydrogen storage tank insert part,
a service providing space having a ring-shaped inner circumference surface of the frame as its outer edges is formed by the frame, and
power can be supplied from the fuel cell to a service providing unit installed inside the service providing space.

2. The service providing mobile unit according to claim 1, wherein the frame is comprised of an upper frame part and lower frame part arranged facing each other and extending in strip shapes and a pair of side frame parts arranged facing each other, and the upper frame part, lower frame part, and side frame parts form a square shaped service providing space.

3. The service providing mobile unit according to claim 1, wherein the frame is comprised of an upper frame part and lower frame part arranged facing each other and extending in strip shapes and a pair of side frame parts arranged facing each other, and the hydrogen storage tank insert part is formed in at least one of the frame part among the side frame parts and the lower frame part.

4. The service providing mobile unit according to claim 1, wherein the frame is provided with a lower frame part extending in a strip shape, a small-sized motor unit having drive wheels is connectable to one end portion of the lower frame part, and driven wheels are attached to another end portion of the lower frame part.

5. The service providing mobile unit according to claim 4, wherein, the frame is provided with a side frame part extending upward from one end part of the lower frame part, the side frame part is positioned further rearward than a forward direction end portion of the small-sized motor unit connected to the one end portion of the lower frame part, and the hydrogen storage tank insert part is formed in the side frame part.

6. The service providing mobile unit according to claim 1, wherein a supply terminal of power generated by the fuel cell is arranged on the frame.

7. The service providing mobile unit according to claim 6, wherein in addition to the supply terminal of power generated by the fuel cell, a supply terminal of hydrogen and a supply terminal of high temperature air are arranged on the frame.

8. The service providing mobile unit according to claim 1, wherein
a hydrogen inflow part connected to the fuel cell is formed in a deep portion of each hydrogen storage tank insert part,
a hydrogen outflow part which is coupled with the hydrogen inflow part when the hydrogen storage tank is inserted into the hydrogen storage tank insert part is formed at one end portion of the hydrogen storage tank,
a grippable handle is formed at another end portion of the hydrogen storage tank, and
a work of inserting the hydrogen storage tank into the hydrogen storage tank insert part and a work of coupling the hydrogen inflow part and the hydrogen outflow part are performed by gripping the handle.

9. The service providing mobile unit according to claim 8, wherein the work of coupling the hydrogen inflow part and the hydrogen outflow part is performed by gripping the handle and rotating the hydrogen storage tank.

10. The service providing mobile unit according to claim 8, wherein the hydrogen inflow part is formed in a projecting shape and the hydrogen outflow part is formed in a recessed shape, and the hydrogen inflow part and the hydrogen outflow part are coupled by fitting the recessed hydrogen outflow part of the hydrogen storage tank onto the projecting hydrogen inflow part.

11. The service providing mobile unit according to claim 10, wherein the recessed hydrogen outflow part and the projecting hydrogen inflow part have a coupling structure where the recessed hydrogen outflow part is coupled with the projecting hydrogen inflow part if the recessed hydrogen outflow part is made to rotate after fitting the recessed hydrogen outflow part into the projecting hydrogen inflow part.

12. The service providing mobile unit according to claim 11, wherein the coupling structure is comprised of a screw structure.

13. The service providing mobile unit according to claim 8, wherein a guide wall for guiding the recessed hydrogen outflow part of the hydrogen storage tank to the projecting hydrogen inflow part when inserting the hydrogen storage tank into the hydrogen storage tank insert part is formed at the hydrogen storage tank insert part.

14. The service providing mobile unit according to claim 13, wherein the guide wall has a cylindrical shape.

15. The service providing mobile unit according to claim 8, wherein a sensor for detecting a state of stored hydrogen inside the hydrogen storage tank is arranged at the other end portion side of the hydrogen storage tank.

16. The service providing mobile unit according to claim 8, wherein two end faces of the hydrogen storage tank are formed from flat surfaces.

17. The service providing mobile unit according to claim 8, wherein a normally closed type outflow control valve for controlling an outflow of hydrogen from the hydrogen storage tank is arranged at the hydrogen outflow part, and a valve opening control device for controlling opening of the outflow control valve is arranged at the hydrogen inflow part.

18. The service providing mobile unit according to claim 8, wherein a hydrogen supply control device for controlling a supply of hydrogen from the hydrogen storage tank to the fuel cell is provided, the hydrogen supply control device has a remaining hydrogen amount estimating unit for estimating a remaining amount of hydrogen inside the hydrogen storage tank, and a hydrogen storage tank for supplying hydrogen to the fuel cell is selected based on the estimated remaining amount of hydrogen inside the hydrogen storage tank.

19. The service providing mobile unit according to claim 18, wherein a plurality of the hydrogen storage tank insert parts are formed inside the frame, at least one hydrogen storage tank is selected from among the hydrogen storage tanks inserted in the hydrogen storage tank insert parts, hydrogen is supplied from the selected hydrogen storage tank to the fuel cell, when the estimated remaining amount of hydrogen of the selected hydrogen storage tank falls below a set amount of hydrogen, at least one next hydrogen storage tank is selected from the hydrogen storage tanks inserted into the hydrogen storage tank insert parts and hydrogen is supplied to the fuel cell from the selected next storage tank.

20. The service providing mobile unit according to claim 18, wherein the hydrogen supply control device has a display device for displaying the fact that the hydrogen storage tank should be replaced when the estimated remaining amount of hydrogen of the hydrogen storage tank falls below the set amount of hydrogen.

21. The service providing mobile unit according to claim 18, wherein a sensor for detecting a state of stored hydrogen inside the hydrogen storage tank is arranged at the other end portion side of the hydrogen storage tank, and the remaining hydrogen amount estimating unit estimates a remaining amount of hydrogen inside the hydrogen storage tank based on a detection signal of the sensor.

* * * * *